US006984679B2

(12) United States Patent
Papenfuhs et al.

(10) Patent No.: US 6,984,679 B2
(45) Date of Patent: Jan. 10, 2006

(54) PLASTICIZER-CONTAINING POLYVINYLBUTYRALS, METHOD FOR PRODUCING THE SAME AND THE USE THEREOF, ESPECIALLY FOR PRODUCING FILMS FOR USE IN LAMINATED SAFETY GLASSES

(75) Inventors: Bernd Papenfuhs, Obertshausen (DE); Martin Steuer, Liederbach (DE)

(73) Assignee: Kurray Specialties Europe GmbH, Frankfurt (DE)

( * ) Notice: Subject to any disclaimer, the term of this patent is extended or adjusted under 35 U.S.C. 154(b) by 0 days.

(21) Appl. No.: 10/451,372

(22) PCT Filed: Dec. 22, 2001

(86) PCT No.: PCT/EP01/15302

§ 371 (c)(1),
(2), (4) Date: Nov. 7, 2003

(87) PCT Pub. No.: WO02/055595

PCT Pub. Date: Jul. 18, 2002

(65) Prior Publication Data

US 2004/0065229 A1    Apr. 8, 2004

(30) Foreign Application Priority Data

Jan. 9, 2001 (DE) ............................... 101 00 681

(51) Int. Cl.
*C08K 5/09* (2006.01)

(52) U.S. Cl. ..................... 524/284; 524/292; 524/297; 524/314; 524/557

(58) Field of Classification Search ................. 524/284, 524/292, 297, 314, 557
See application file for complete search history.

(56) References Cited

U.S. PATENT DOCUMENTS

| 2,956,978 | A | | 10/1960 | Reeves et al. | |
|---|---|---|---|---|---|
| 3,539,442 | A | * | 11/1970 | Buckley et al. | 428/412 |
| 3,558,418 | A | * | 1/1971 | Porter, Jr. et al. | 428/327 |
| 3,841,955 | A | * | 10/1974 | Coaker et al. | 428/437 |
| 4,009,136 | A | * | 2/1977 | Lewandowski et al. | 523/171 |
| 4,361,625 | A | * | 11/1982 | Beckmann et al. | 428/412 |
| 4,792,464 | A | * | 12/1988 | Martenson | 427/156 |
| 5,032,216 | A | * | 7/1991 | Felten | 216/87 |
| 5,137,954 | A | | 8/1992 | DasGupta et al. | |

FOREIGN PATENT DOCUMENTS

| DE | 24 53 780 | 5/1976 |
|---|---|---|
| DE | 28 20 780 | 11/1979 |
| EP | 0 166 400 | 1/1986 |
| EP | 1 104 783 | 6/2001 |
| WO | WO 97/24230 | 7/1997 |

* cited by examiner

*Primary Examiner*—Bernard Lipman
(74) *Attorney, Agent, or Firm*—Banner & Witcoff, Ltd.

(57) ABSTRACT

The invention relates to plasticizer-containing polyvinylbutyrals that are characterized by containing as the plasticizer at least one dibenzoate of alkylene and polyalkylene glycols. The invention further relates to a method for producing said compounds, and to their use in molding compounds of all types, especially for producing films that can for example be used as an intermediate layer in laminated safety glasses.

11 Claims, 3 Drawing Sheets

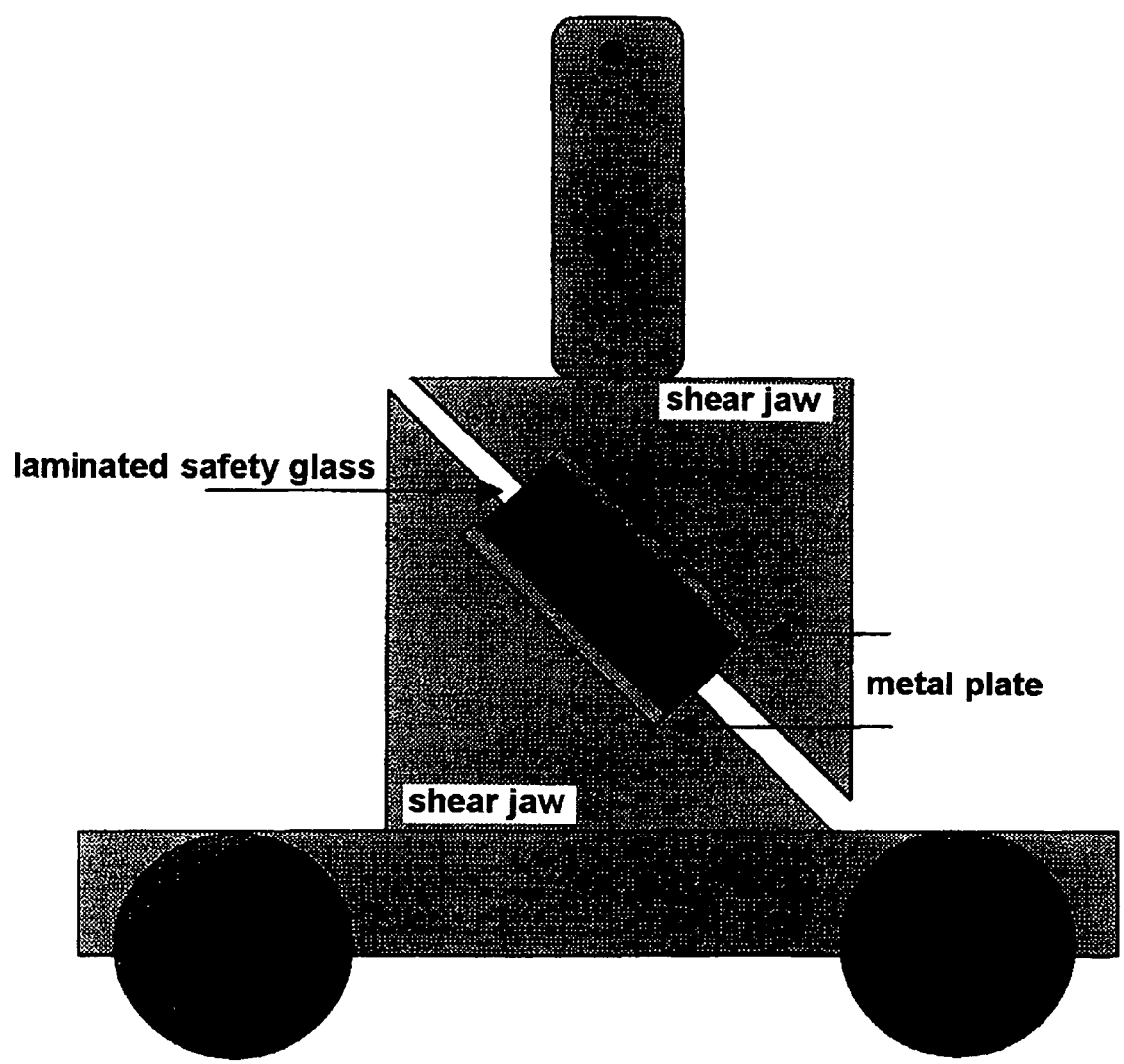

PLASTICIZER-CONTAINING POLYVINYLBUTYRALS, METHOD FOR PRODUCING THE SAME AND THE USE THEREOF, ESPECIALLY FOR PRODUCING FILMS FOR USE IN LAMINATED SAFETY GLASSES

This application is a National Stage application of co-pending PCT application PCT/EP01/15302 filed Dec. 22, 2001, which claims the benefit of DE patent application Ser. No. 10100681.0 filed Jan. 9, 2001. These applications are incorporated herein by reference in their entireties.

The present invention relates to plasticized polyvinyl butyrals, to a process for their preparation, and also to their use in any desired molding compositions, in particular for producing films, an example of the use of which is an intermediate layer in laminated safety glass.

The use of polyvinyl butyral (PVB) for producing films for laminated safety glass (LSG) is known. There is also a known need to plasticize the polyvinyl butyral, the glass transition temperature of which is much too high without addition of suitable plasticizers. Specifically and firstly, it is impossible to use the known extrusion methods to process unplasticized PVB to give films, and secondly the required penetration resistance of the films cannot be achieved without addition of plasticizers.

Certain requirements have to be complied with by plasticizers suitable for producing PVB films. Important properties are, inter alia, very good compatibility with PVB, high transparency (colorless, free from haze), a high boiling point, and a low moisture content, and also a high level of hydrophobic properties.

Known plasticizers for PVB are the esters of aliphatic mono- and dicarboxylic acids with mono- or polyhydric alcohols or with oligoalkylene glycol ethers, and also various phthalates, for examples those disclosed in U.S. Pat. No. 5,137,954. However, it is preferable to use the diesters of di-, tri- or tetraethylene glycols with aliphatic monocarboxylic acids, or else dialkyl adipates.

Particular preference is given to the use of polyethylene glycol di-2-ethylhexanoate as plasticizer, due to good compatibility with PVB and low price, and its use is disclosed in DE-A-24 53 780 and WO 97/24230, for example. However, triethylene glycol di-2-ethylhexanoate has the disadvantage as plasticizer of having good compatibility only with polyvinyl butyral whose polyvinyl alcohol content (PVA content is below 19.5% by weight.

DE-A-28 20 780 discloses dibenzoates of di- and trialkylene glycols, known from U.S. Pat. No. 2,956,978, for example, as a possible constituent of a specific phosphoric-ester-containing plasticizer mixture for PVB.

It was therefore an object of the present invention to provide plasticizers which can plasticize PVB and have very good compatibility with PVB, and also in particular with relatively hydrophilic polyvinyl butyrals having relatively high polyvinyl alcohol contents. The plasticizers should moreover as far as possible be less expensive than the known plasticizers for PVB.

BRIEF DESCRIPTION OF THE DRAWINGS

FIG. 3 is a schematic illustration of test specimens clamped into a specimen holder.

Figure 1:
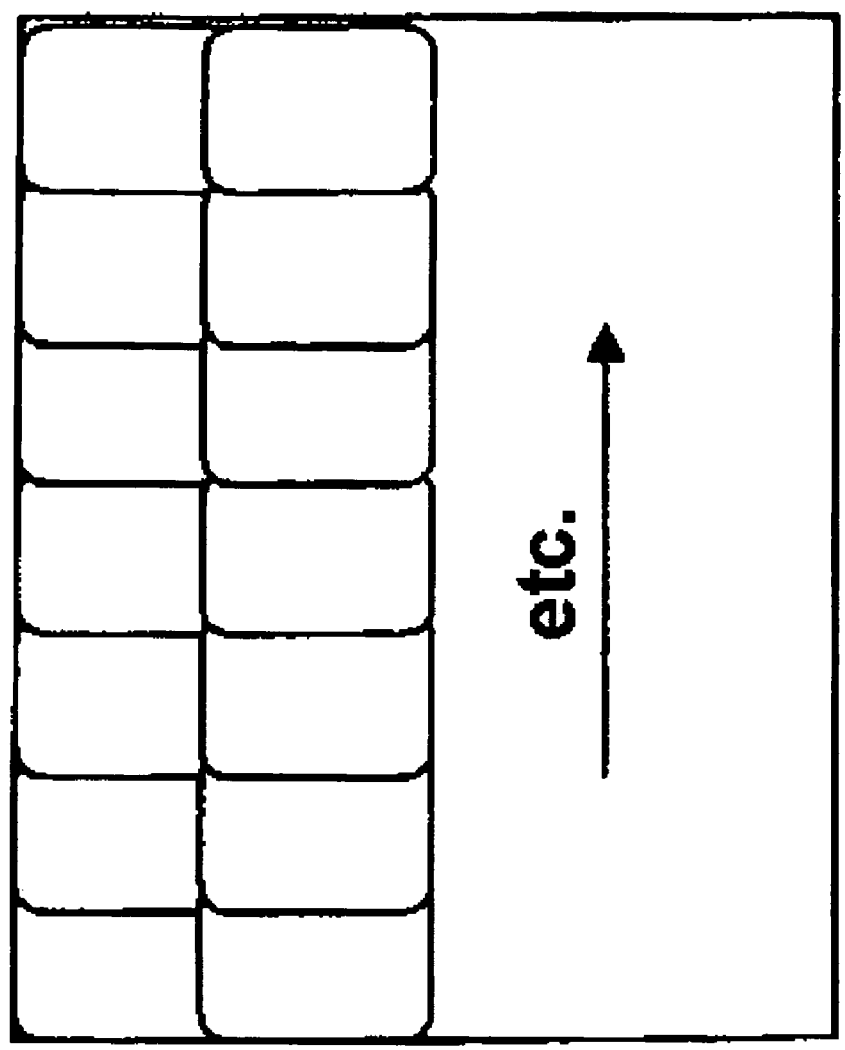
FIG. 1 is a schematic illustration of the orientation of pummel test impacts on laminated safety glass test specimens.

Surprisingly, it has been found that dibenzoates of alkylene and/or polyalkylene glycols, in particular of di-, tri-, and/or tetraalkylene glycols, achieve the abovementioned object and are markedly better than the compounds normally used for plasticizing PVB in meeting the demands made of them as plasticizers for plasticizing PVB.

The present invention therefore provides plasticized polyvinyl butyrals which comprise, as plasticizer, at least one dibenzoate of alkylene and/or polyalkylene glycols.

Preferred plasticizers are dibenzoates of di-, tri-, or tetraalkylene glycols, and particular preference is given to the dibenzoates of the dialkylene glycols, and here in particular dipropylene glycol dibenzoate.

As a result of their preparation, the dibenzoate plasticizers may also comprise the corresponding monobenzoates. They may moreover also comprise the benzoic esters of the corresponding monoalkylene glycols.

The plasticizers used according to the invention have considerably better compatibility with the polyvinyl butyral. Compared with the prior art, the increased compatibility is seen in minimization of the undesired phenomena of exudation.

This result is surprising, since the plasticizers present in the polyvinyl butyrals of the invention are comparable with the known alkylene glycol diesters known for PVB film production, including triethylene glycol di-2-ethylhexanoate, in their chemical structure and in the ratio of hydrophilic and hydrophobic molecular fractions—known as the HLB value (hydrophilic/lipophilic balance).

The very good compatibility with polyvinyl butyral is moreover not restricted to the narrow range disclosed in WO 97/24230 of PVA content of from 19.5 to 17.0% by weight in the polyvinyl butyral, but also encompasses acetals which are markedly more hydrophilic.

For example, the polyvinyl alcohol contents of the polyvinyl butyrals used as starting materials are preferably from 10 to 25% by weight, particularly preferably from 16 to 23% by weight.

There is absolutely no restriction on the molar mass of polyvinyl butyrals used. However, preference is given to polyvinyl butyrals with a molar mass of at least 50 000 g/mol.

The polyvinyl acetate contents of the polyvinyl butyrals used as starting materials are preferably from 0 to 20% by weight.

The plasticized polyvinyl butyrals of the invention preferably comprise from 5 to 90 parts by weight, particularly preferably from 15 to 85 parts by weight, in particular from 25 to 80 parts by weight, of plasticizer, based on 100 parts by weight of polyvinyl butyral.

The plasticizers present in the plasticized polyvinyl butyrals of the invention also have a marked price advantage over known plasticizers, e.g. triethylene glycol di-2-ethylhexanoate. This advantage results from using benzoic acid in their preparation, this acid being considerably less expensive than relatively long-chain aliphatic carboxylic acids.

Another advantage of the plasticized polyvinyl butyrals of the invention is that the good compatibility of the plasticizers permits the use of higher proportions of plasticizer in the PVB, permitting glass transition temperatures to be set lower.

The plasticized polyvinyl butyrals of the invention may comprise other plasticizers, besides the dibenzoate plasticizers of the invention, which in their turn may be composed of a mixture. Other plasticizers which may be used here are any of the plasticizing compounds known to the skilled worker, in particular esters of mono- or polybasic acids, of mono- or polyhydric alcohols, or of alkylene or polyalkylene glycols.

Examples of preferred other plasticizers are diesters of aliphatic diols, or else of (poly)alkylene glycols or of (poly)alkylene polyols with aliphatic carboxylic acids, preferably diesters of polyalkylene glycols, in particular diesters of di-, tri-, or tetraethylene glycol with aliphatic ($C_6$–$C_{10}$) carboxylic acids, and also diesters of aliphatic or aromatic ($C_2$–$C_{18}$) dicarboxylic acids with aliphatic ($C_4$–$C_{12}$) alcohols, for example phthalates, preferably dihexyl adipate, and also mixtures of the esters mentioned.

The proportion of the additional plasticizers, based on the total amount of plasticizer, is generally in the range from 0 to 99% by weight, preferably in the range from 0 to 80% by weight, and particularly preferably in the range from 0 to 50% by weight.

The plasticized polyvinyl butyrals of the invention may moreover also comprise conventional additives, such as release agents, stabilizers, dyes, and/or pigments.

The present application also provides a process for preparing the plasticized polyvinyl butyrals of the invention, which comprises mixing and homogenizing the at least one dibenzoate plasticizer, and also, where appropriate, additional other plasticizers, and the polyvinyl butyral. This mixing and homogenizing may take place in either one step of a process or in two adjacent steps of a process. The mixture here may, where appropriate, also comprise other additives, e.g. release agents, stabilizers, dyes, and/or pigments.

This mixing and homogenizing may take place in any of the apparatuses known to the skilled worker and suitable for these purposes. Examples of suitable apparatuses are mixers, kneaders, and extruders, where these may also be capable of operation at an elevated temperature and/or at superatmospheric pressure.

The plasticized polyvinyl butyrals of the invention are used for preparing any desired molding composition, but in particular for producing films.

The present application therefore also provides a molding composition comprising the plasticized polyvinyl butyrals of the invention.

However, the present application in particular also provides a film comprising the plasticized polyvinyl butyrals of the invention.

Processes for preparing polyvinyl butyral films are known to the skilled worker. For example, the plasticized polyvinyl butyrals of the invention may be processed directly to give a film by extrusion, for example using a slot die, or by casting. The films of the invention may comprise other conventional additives, e.g. antioxidants, UV stabilizers, dyes, pigments, and also release agents.

Compared with the prior art, the films of the invention minimize undesirable exudation phenomena. Alongside the relatively low price, this property is highly advantageous for the main application sector of the films, the production of laminated safety glass.

The present invention therefore also provides the use of the films of the invention for producing laminated safety glass.

Examples are used below to describe the invention in more detail, but do not in any way restrict the same.

Test Methods:

Tensile Stress at Break

Prior to measurement of tensile stress at break, the films are conditioned for 24 hours at 23° C. and relative humidity of 50%. The tensile stress at break is measured using a machine for testing tensile and compressed strength (manufacturer: Cadis GbR, model: BRP 201) to DIN 53455.

Melt Index (MFR 190)

Prior to measurement of the melt index, the films are conditioned for 24 hours at 23° C. and relative humidity of 50%. The films are measured using a melt index test device (manufacturer: Göttfert, model: MP-D) at 190° C. with a load of 2.16 kg using a 2 mm die to ISO 1133.

Pummel

The test specimens for the pummel test are produced as follows: the films are conditioned at 23° C./50% relative humidity for 24 hours. They are laminated to 2 mm floatglass with F/Sn orientation of film to glass surface. The glass is washed with demineralized water prior to coating. The laminated panes of glass are produced by compressing the composites in a prelamination oven using calender rolls at temperatures of from 40° C. to 100° C. and then compressing the composites in an autoclave at a pressure of 12 bar and at a temperature of 140° C. for 30 minutes.

Figure 2:
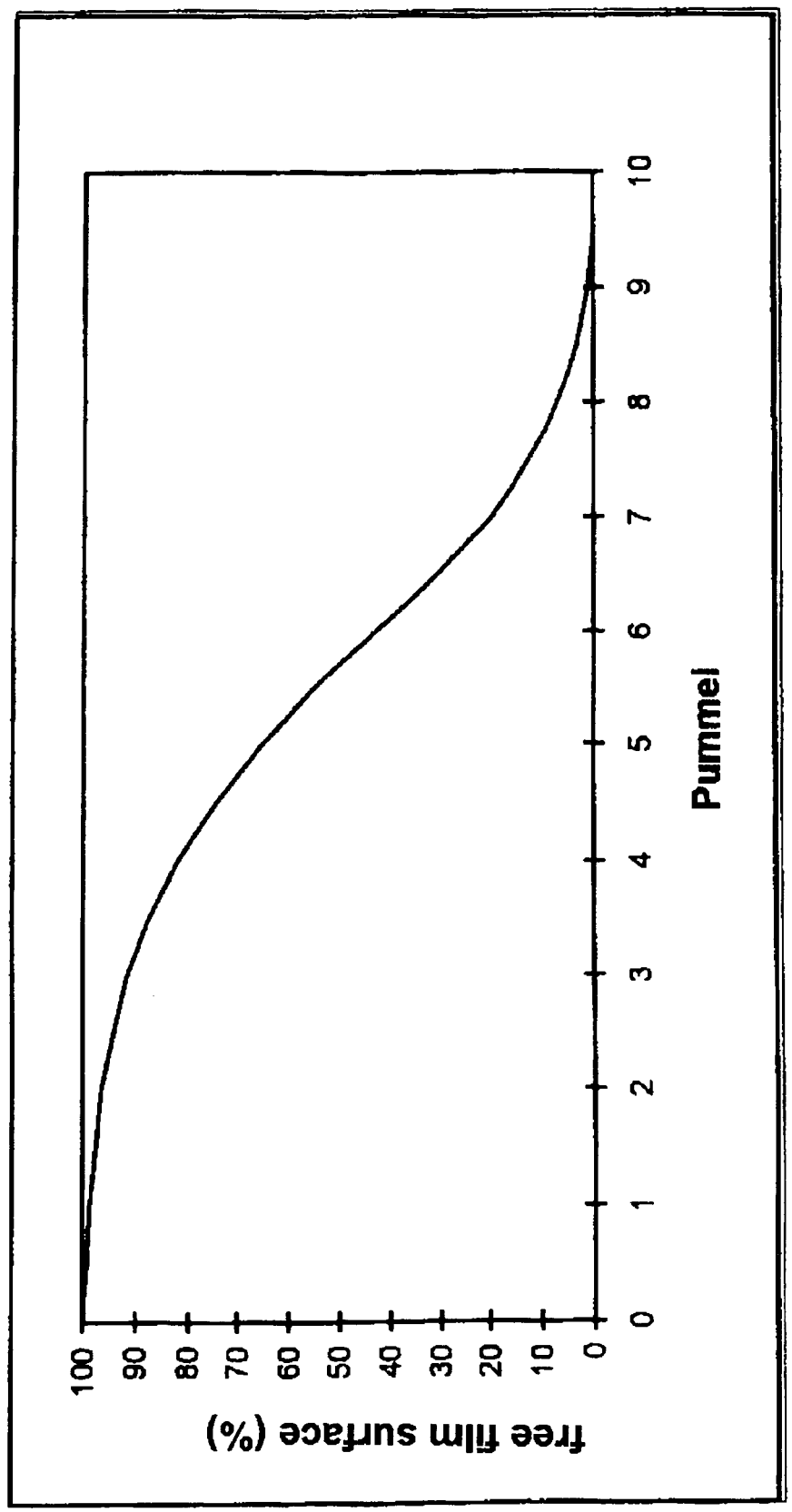
FIG. 2 is a graphical presentation of pummel test results using a standard pummel scale from 0 to 10.

Test specimens of dimensions 10×30 cm are cut from the resultant laminated safety glass in order to carry out the pummel test. The test specimens are held at −18° C. for 4 hours and then placed on a support tilted at 45°, and impacted with an automatic hammer until the glass has been pulverized. The orientation of the impacts is as shown in FIG. 1. The results are evaluated using a standard pummel scale from 0 to 10, as shown in FIG. 2.

Shear Test

The test specimens for the shear test are produced as follows: the films are conditioned at 23° C./30% relative humidity for 24 hours. They are laminated to 2 mm floatglass with F/Sn orientation of film to glass surface. The glass is washed with demineralized water prior to coating. The laminated panes of glass are produced by compressing the composites in a prelamination oven using calender rolls at temperatures of from 40° C. to 100° C. and then compressing the composites in an autoclave at a pressure of 12 bar and at a temperature if 140° C. for 30 minutes.

10 test specimens of dimensions 25.4×25.4 mm are cut from each resultant laminated safety glass in order to carry out the shear test. Prior to measurement, the test specimens are held at 23° C./50% relative humidity for 4 hours. The test specimens are clamped at an angle of 45° into a specimen holder as in FIG. 3. A continuously rising force directed vertically downward is applied to the upper half of the test specimen until release takes place under shear between glass and film within the test specimen. The force needed for release under shear is determined across 10 test specimens for each example, and standardized, based on the area of the test specimen.

Polyvinyl Alcohol Content of PVB

PVB is acetylated with an excess of acetic anhydride in pyridine. After the reaction, the excess acetic anhydride is hydrolyzed with water, and the resultant acetic acid is titrated potentiometrically with sodium hydroxide solution. The PVOH content is calculated from the consumption of sodium hydroxide solution.

Polyvinyl Acetate Content of PVB

PVB is dissolved in a benzyl alcohol/ethanol mixture. The acetyl groups are saponified with an excess of alcoholic potassium hydroxide. The excess potassium hydroxide solution is back-titrated with hydrochloric acid. The polyvinyl acetate content is calculated from the consumption of hydrochloric acid.

Haze, Yellowness Index

The test specimens for the optical measurements are produced as follows: the films are laid between 2 plates of 2 mm floatglass (format: 10×30 cm). The glass is washed with demineralized water prior to coating. Panes of laminated safety glass are produced by pressing the composites in a hydraulic press at a pressure of 17 bar and at a temperature of 150° C. for 1 minute.

The optical values for the glass composites are measured by means of a color measurement device (manufacturer: Hunter Associates, model: Lab Scan 5100). The values for the glass are measured prior to production of the composite and subtracted from the value measured for the composite, giving the values measured for the films. The values for the films are standardized to a film thickness of 0.76 mm.

Plasticizer Compatibility

Plasticized PVB films are pressed and polished at 170° C. to a thickness of 0.76 mm in a hydraulic press. The films from the polishing press are used to stamp out test specimens in 1.5 cm×10 cm format, and these are stored in a desiccator at 23° C. over saturated aqueous copper sulfate solution.

Plasticizer compatibility is assessed after 28 days. If there is incompatibility, the plasticizer exudes and forms a liquid film or droplet on the film surface.

Molar Mass Mw

The molar masses of the polyvinyl butyrals used are determined by gel permeation chromatography (GPC) in glacial acetic acid, using RI detectors. The detectors are calibrated with PVB calibration standards whose absolute values are determined by static light scattering.

EXAMPLES

Mixing and Extrusion

Polyvinyl butyrals with various residual PVOH contents are mixed with various plasticizers prior to extrusion. The mixing takes place in laboratory mixers (manufacturer: Papenmeier, model TGHKV20/KGU63; Brabender, model 826801). A UV stabilizer, (e.g. Tinuvin® P, manufacturer: Ciba Specialty Chemicals) where appropriate, and also a certain amount of release agent, where appropriate, are dissolved or emulsified in the plasticizer prior to preparation of the mixtures. The PVB/plasticizer mixtures are used to extrude flat films with a thickness of 0.8 mm. The extrusion processes in Examples 1 to 3, 6 and 7, and also in Comparative Examples 1a–e, 2a–e and 3a–e, take place in a single-screw extruder (manufacturer: Haake) equipped with slot die, at a melt temperature of 150° C.

The extrusion processes in Examples 4 and 5 and also in Comparative Examples 4 and 5, take place in a twin-screw extruder with corotating screws (manufacturer: Leistritz) equipped with melt pump and slot die, at a melt temperature of 200° C.

Example 1

290 g of PVB (polyvinyl alcohol content=22.0% by weight, polyvinyl acetate content=0.2% by weight, Mw=104 300 g/mol) and 210 g of dipropylene glycol dibenzoate (=DPGDB) are used.

Comparative Example 1a

As Example 1. Instead of DPGDB, 210 g of triethylene glycol bis-2-ethylbutanoate (=3G6) are used.

Comparative Example 1b

As Example 1. Instead of DPGDB, 210 g of triethylene glycol bis-n-heptanoate (=3G7) are used.

Comparative Example 1c

As Example 1. Instead of DPGDB, 210 g of triethylene glycol bis-2-ethylhexanoate (=3G8) are used.

Comparative Example 1d

As Example 1. Instead of DPGDB, 210 g of tetraethylene glycol bis-n-heptanoate (=4G7) are used.

Comparative Example 1e

As Example 1. Instead of DPGDB, 210 g of dihexyl adipate (=DHA) are used.

Example 2

255 g of PVB (polyvinyl alcohol content=20.6% by weight, polyvinyl acetate content=1.1% by weight, Mw=107 000 g/mol) and 245 g of DPGDB are used.

Comparative Example 2a

As Example 2. Instead of DPGDB, 245 g of 3G6 are used.

Comparative Example 2b

As Example 2. Instead of DPGDB, 245 g of 3G7 are used.

Comparative Example 2c

As Example 2. Instead of DPGDB, 245 g of 3G8 are used.

Comparative Example 2d

As Example 2. Instead of DPGDB, 245 g of 4G7 are used.

Comparative Example 2e

As Example 2. Instead of DPGDB, 245 g of DHA are used.

Example 3

240 g of PVB (polyvinyl alcohol content 18.9% by weight, polyvinyl acetate content=1.1% by weight, Mw=108 000 g/mol) and 260 g of DPGDB are used.

Comparative Example 3a

As Example 3. Instead of DPGDB, 260 g of 3G6 are used.

Comparative Example 3b

As Example 3. Instead of DPGDB, 260 of g 3G7 are used.

Comparative Example 3c

As Example 3. Instead of DPGDB, 260 g of 3G8 are used.

Comparative Example 3d

As Example 3. Instead of DPGDB, 260 g of 4G7 are used.

Comparative Example 3e

As Example 3. Instead of DPGDB, 260 g of DHA are used.

Examples 1 to 3 and also Comparative Examples 1a–e, 2a–e, 3a–e, confirm the excellent compatibility of dipropylene glycol dibenzoate as plasticizer (cf. Tables 1 to 3).

Example 4

2100 g of PVB (polyvinyl alcohol content=20.6% by weight, polyvinyl acetate content=1.1% by weight, Mw=107 000 g/mol), 900 g of DPGDB, and 4.5 g of Tinuvin® P are used.

Comparative Example 4

2220 g of PVB (polyvinyl alcohol content=20.6% by weight, polyvinyl acetate content=1.1% by weight, Mw=107 000 g/mol), 780 g of 3G7, and 4.5 g of Tinuvin® P are used.

Example 5

2100 g of PVB (polyvinyl alcohol content=20.6% by weight, polyvinyl acetate content=1.1% by weight, Mw=107 000 g/mol), 780 g of DPGDB, and 4.5 g of Tinuvin® P, and 6 g of a 25% strength aqueous solution of potassium acetate as release agent are used.

Comparative Example 5

2247 g of PVB (polyvinyl alcohol content=20.6% by weight, polyvinyl acetate content=1.1% by weight, Mw=107 000 g/mol), 753 g of DHA, and 4.5 g of Tinuvin® P, and 6 g of a 25% strength aqueous solution of potassium acetate as release agent are used.

TABLE 1

| Example | Example 1 | Comparative Example 1a | Comparative Example 1b | Comparative Example 1c | Comparative Example 1d | Comparative Example 1e |
|---|---|---|---|---|---|---|
| Polyvinyl alcohol content PVB [%] | 22 | 22 | 22 | 22 | 22 | 22 |
| Polyvinyl acetate content PVB [%] | 0.2 | 0.2 | 0.2 | 0.2 | 0.2 | 0.2 |
| Plasticizer type | DPGDB | 3G6 | 3G7 | 3G8 | 4G7 | DHA |
| Plasticizer content [% initial weight] | 42 | 42 | 42 | 42 | 42 | 42 |
| Plastizer compatibility | Compatible | incompatible | incompatible | incompatible | incompatible | incompatible |

TABLE 2

| Example | Example 2 | Comparative Example 2a | Comparative Example 2b | Comparative Example 2c | Comparative Example 2d | Comparative Example 2e |
|---|---|---|---|---|---|---|
| Polyvinyl alcohol content PVB [%] | 20.6 | 20.6 | 20.6 | 20.6 | 20.6 | 20.6 |
| Polyvinylacetate content PVB [%] | 1.1 | 1.1 | 1.1 | 1.1 | 1.1 | 1.1 |
| Plasticizer type | DPGDB | 3G6 | 3G7 | 3G8 | 4G7 | DHA |
| Plasticizer content [% initial weight] | 49 | 49 | 49 | 49 | 49 | 49 |
| Plasticizer compatibility | Compatible | incompatible | incompatible | incompatible | incompatible | incompatible |

TABLE 3

| Example | Example 3 | Comparative Example 3a | Comparative Example 3b | Comparative Example 3c | Comparative Example 3d | Comparative Example 3e |
|---|---|---|---|---|---|---|
| Polyvinyl alcohol content PVB [%] | 18.9 | 18.9 | 18.9 | 18.9 | 18.9 | 18.9 |
| Polyvinyl acetate content PVB [%] | 1.1 | 1.1 | 1.1 | 1.1 | 1.1 | 1.1 |
| Plasticizer type | DPGDB | 3G6 | 3G7 | 3G8 | 4G7 | DHA |
| Plasticizer content [% initial weight] | 52 | 52 | 52 | 52 | 52 | 52 |
| Plasticizer compatibility | Compatible | incompatible | incompatible | incompatible | incompatible | incompatible |

Examples 4 and 5 and Comparative Examples 4 and 5 confirm that in order to achieve comparable rheological properties of the film (seen from the MFR 190 values) more plasticizer is needed when using DPGDB than when using standard plasticizers. Surprisingly, despite higher plasticizer content when using DPGDB, the result is higher mechanical strengths of the films, and also higher adhesion values than with standard plasticizers (cf. Table 4).

TABLE 4

| Example | Example 4 | Comparative Example 4 | Example 5 | Comparative Example 5 |
|---|---|---|---|---|
| Plasticizer type | DPGDB | 3G7 | DPGDB | DHA |
| Plasticizer content [% initial weight] | 30 | 26 | 30 | 25.1 |
| Potassium acetate content [%] |  |  | 0.05 | 0.05 |
| Tinuvin P content [%] | 0.15 | 0.15 | 0.15 | 0.15 |
| Longitudinal tensile stress at break [N/mm$^2$] | 31.43 | 28.28 | 30.93 | 28.82 |
| MFR 190 [g/10 min] | 2.33 | 2.28 | 2.23 | 2.31 |
| Shear test F/Sn [N/mm$^2$] | 28.29 | 16.94 | 22.58 | 13.05 |
| Haze | 0.03 | 0.05 | 0.09 | 0.02 |
| Yellowness Index | 0.66 | 0.84 | 0.98 | 0.82 |

Example 6

350 g of PVB (polyvinyl alcohol content=20.5% by weight, polyvinyl acetate content=1.1% by weight, Mw=104 000 g/mol), 100 g of DHA und 50 g of DPGDB are used.

Example 7

350 g of PVB (polyvinyl alcohol content=20.5% by weight, polyvinyl acetate content=1.1% by weight, Mw=104 000 g/mol), 100 g of 3G7 und 50 g of DPGDB are used.

Examples 6 and 7 confirm that mixtures of DPGDB with other plasticizers are also suitable for producing PVB films for laminated safety glass (cf. Table 5).

TABLE 5

| Example | Example 6 | Example 7 |
|---|---|---|
| Polyvinyl alcohol content PVB [%] | 20.5 | 20.5 |
| Polyvinylacetate content PVB [%] | 1.1 | 1.1 |
| Plasticizer (WM) | Mixture DHA/DPGDB (ratio 2:1) | Mixture 3G7/DPGDB (ratio 2:1) |
| Plasticizer content [% initial weight] | 30 | 30 |
| Plasticizer compatibility | Compatible | compatible |
| MFR 190 [g/10 min] | 3.55 | 3.1 |

TABLE 5-continued

| Example | Example 6 | Example 7 |
|---|---|---|
| Pummel F | 8 | 8.5 |
| Haze | 0.06 | 0.07 |
| Yellowness Index | 0.3 | 0.39 |

What is claimed is:

1. A plasticized polyvinyl butyral, which comprises,
   at least one dibenzoate of alkylene glycol, polyalkylene glycol,
   in a mixture with
   at least one additional plasticizer selected from the group consisting of
      diesters of
         aliphatic diols
         (poly)alkylene glycols or
         (poly)alkylene polyols
      with aliphatic carboxylic acids, and
      diesters of
         aliphatic or aromatic ($C_2$–$C_{18}$) dicarboxylic acids
         with aliphatic ($C_4$–$C_{12}$) alcohols.

2. The polyvinyl butyral as claimed in claim 1, which comprises, as plasticizer, dibenzoates of di-, tri-, and/or tetraalkylene glycols.

3. The polyvinyl butyral as claimed in claim 1, which comprises, as plasticizer, dibenzoate of dialkylene glycols.

4. The polyvinyl butyral as claimed in claim 1, which comprises, as plasticizer, dipropylene glycol dibenzoate.

5. The polyvinyl butyral as claimed in claim 1, which comprises from 5 to 90 parts by weight of dibenzoate of alkylene, polyalkylene glycols, or a mixture of any of them, based on 100 parts by weight of polyvinyl butyral.

6. The polyvinyl butyral as claimed in claim 1, which comprises, as additional plasticizer, a diester of di-, tri-, or tetraethylene glycol with $C_6$–$C_{10}$ aliphatic ($C_6$–$C_{10}$) carboxylic acids, or dihexyl adipate.

7. A process for preparing polyvinyl butyral as claimed in any of claims 1 to 6, which comprises mixing and homogenizing the at least one dibenzoate plasticizer, and also, where appropriate, additional other plasticizers, and the polyvinyl butyral.

8. A process for preparing a molding composition, comprising the use of polyvinyl butyral as claimed in any of claims 1 to 6.

9. A process for producing a film, comprising the use of polyvinyl butyral as claimed in any of claims 1 to 6.

10. A film comprising a polyvinyl butyral as claimed in any of claims 1 to 6.

11. A method of producing laminated safety glass, comprising using a film comprising a polyvinyl butyral as claimed in any one of claims 1 to 6.

* * * * *